US006728618B2

(12) United States Patent
Heckmann et al.

(10) Patent No.: US 6,728,618 B2
(45) Date of Patent: Apr. 27, 2004

(54) METHOD FOR ACTIVATING A SYSTEM FOR CONTROLLING AND/OR REGULATING OPERATIONAL SEQUENCES IN A MOTOR VEHICLE HAVING SEVERAL EQUAL-ACCESS CONTROL UNITS (75) Inventors: Hans Heckmann, Karlsruhe (DE); Reinhard Weiberle, Vaihingen/Enz (DE); Bernd Kesch, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/278,286

(22) Filed: Oct. 23, 2002

(65) Prior Publication Data
US 2003/0088353 A1 May 8, 2003

(30) Foreign Application Priority Data
Oct. 24, 2001 (DE) .......................................... 101 52 508

(51) Int. Cl.$^7$ ........................ B60R 22/00; G01M 17/00; H03K 17/00; G05B 23/02; G05B 19/18
(52) U.S. Cl. ........................ 701/48; 701/33; 340/2.26; 340/3.1; 340/3.51; 710/110; 710/116; 710/119; 710/123; 700/2; 700/3; 709/222
(58) Field of Search ...................... 701/48, 33; 340/3.1, 340/2.26, 3.5, 3.51, 3.52, 3.53; 710/107, 109, 110, 111, 112, 113, 116, 119, 123; 370/489, 457; 700/2, 3; 709/222

(56) References Cited

U.S. PATENT DOCUMENTS

| 4,257,095 A | * | 3/1981 | Nadir ........................... 710/119 |
| 4,335,426 A | * | 6/1982 | Maxwell et al. ............ 709/222 |
| 4,817,037 A | * | 3/1989 | Hoffman et al. ............ 710/110 |
| 5,062,044 A | * | 10/1991 | Asami et al. ............... 710/110 |
| 6,230,089 B1 | * | 5/2001 | Lonn et al. .................... 701/48 |
| 6,636,915 B1 | * | 10/2003 | Dabby et al. ................ 710/240 |
| 2003/0018422 A1 | * | 1/2003 | Akiyama ........................ 701/48 |

FOREIGN PATENT DOCUMENTS

| DE | 197 53 288 | 6/1998 | |
| JP | 60236544 A | * 11/1985 | ........... H04L/11/00 |

OTHER PUBLICATIONS

Motorola DSI Bus Standard Release 1.0*.
FlexRay (a communications system under development by BMW, DaimlerChrysler, Motorola, Philips and Bosch)*.

* cited by examiner

Primary Examiner—William A. Cuchlinski, Jr.
Assistant Examiner—B J Broadhead
(74) Attorney, Agent, or Firm—Kenyon & Kenyon (57) ABSTRACT A system for controlling and/or regulating operational sequences in a motor vehicle having several equal-access control units for controlling and/or regulating certain functions in the motor vehicle. Control units each have a volatile memory, and a nonvolatile memory in which a loading routine is included. They are connected to one another via a time-controlled communications system. In order to create a safe and reliable activation of a system, it is proposed that at least one of the control units has a central memory, in which data required for the time-controlled communication are stored for all control units; one of the control units acts as temporary master control unit during an activating process of the system; during the activating process, the master control unit coordinates logging on of the remaining control units to the communications system, in particular transmission of the data from the central memory to the remaining control units via the communications system; and the master control unit ends the temporary master function upon the expiration of a predefinable time period or at termination of the activating process.

22 Claims, 7 Drawing Sheets

METHOD FOR ACTIVATING A SYSTEM FOR CONTROLLING AND/OR REGULATING OPERATIONAL SEQUENCES IN A MOTOR VEHICLE HAVING SEVERAL EQUAL-ACCESS CONTROL UNITS

FIELD OF THE INVENTION

The present invention relates to a method for activating a system for controlling and/or regulating operational sequences in a motor vehicle. The system includes several equal-access control units for controlling and/or regulating certain functions in the motor vehicle. The control units each have a volatile memory and a non-volatile memory including a loading routine. They are connected to one another via a time-controlled communications system.

The present invention also relates to a computer program which may be run on a computing unit, in particular a microprocessor, of a control unit for controlling and/or regulating certain functions in a motor vehicle.

Finally, the present invention also relates to a system for controlling and/or regulating operational sequences in a motor vehicle having several equal-access control units for control and/or regulation. Each control unit includes a volatile memory and a non-volatile memory including a loading routine, and are connected to one another via a time-controlled communications system.

BACKGROUND INFORMATION

A plurality of control devices for controlling or regulating the operational sequences in a motor vehicle are provided. These control devices, of which each controls or regulates a particular functional unit of the motor vehicle during operation, are connected to one another via a communications system. The control units are communications users of the system. One known communications system, for instance, is TTP/C (time-triggered protocol, SAE Class C) or FlexRay (a communications system under development by BMW, DaimlerChrysler, Motorola, Philips and Bosch; Information available on the Internet under http://www.flexray-group.com).

Control units may, in principle, be divided into two categories. On the one hand there are the so-called individual control units. These are control units having an individual program. They are applied, for instance, to regulating braking systems (anti-lock brake systems, ABS) or to regulating an internal combustion engine. On the other hand, control units having the same construction are provided, which are used, for example, for regulating electromechanical brakes (EMB; brake-by-wire). In the case of EMB, four control units are provided one for each wheel, which are identically constructed and operated with the same software. The four control devices fulfill the same function, namely, adjusting the braking force according to a setpoint input.

When each individual wheel is regulated, the differences come about only from the local positioning of the control unit. That is the case in a braking force distribution between front and rear axle, and in operating an ABS,ASR (drive slip regulation) or ESP (electronic stabilizing program). In those cases, the control unit has to know to which wheel it is assigned, since wheel-specific setpoint values are to be lined up.

The control units usually have a non-volatile program memory and a volatile memory. In order to simplify the programming of the control units of the system, particularly with respect to a subsequent modification of functional units of a motor vehicle controlled or regulated by the system, that part of the program which is identical for all control units may be stored in a central memory, and from there may be transmitted to the volatile memory of the individual control units, within the framework of activating the system. In the case of a subsequent modification, a program change has only to be made at one central location, namely the central memory.

Distributed systems having a time-controlled communications system are known, for example, from German Published Patent Application No. 197 53 288. They require a common global time base. This is formed with the participation of all the control units logged on to the communications system. It is known, for example, that one may form the global time base by forming the average value of all the local time bases of the control units. The control units ascertain individual differences between their local time base and the global one. In the control units the difference is added to the local time base, and the sum is used as the global time base. The process just described is called synchronization of the control units to the global time base.

However, in the case of systems, known from the related art, having several control units which are connected by a time-controlled communications system, it is difficult to bring about the activation of the system if the data required for the time-controlled communications for all the control units are stored in the central memory.

A method for operating a time-controlled communications system of Motorola is known from its "DSI Bus Standard, Release 1.0". In this case, in normal operation a master control unit is required, which makes available the global time pulse to the slave control units. In order for the system to remain fully functional even during malfunctioning of the master control unit, the master control unit must be designed to be redundant. This results, however, in considerable additional costs for the hardware that is not used in the normal case. These costs may be saved in the case of systems having equal-access control units as communications users.

SUMMARY OF THE INVENTION

The present invention is based on the creation of a safe and reliable activation of a system for controlling and/or regulating operating sequences in a motor vehicle.

Starting out from the method of the species recited at the outset, the present invention proposes a method having the following method steps to achieve this object:

the system is switched on;

one of the control units temporarily becomes a master control unit;

at least one of the control units has a central memory in which data are stored that are used for the time-controlled communications for all the control units, and, during the activation process of the system, the master control unit coordinating the logging on of the remaining control units to the communications system, in particular the transmission of the data from the central memory via the communications system to the remaining control units; and the temporary master function of the master control unit is ended upon the expiration of a predefinable time duration or at termination of the activating process.

According to the present invention it is proposed that the distributed system shall be operated using a time-controlled communications system in normal operation with equal-access communications users. Thereby, the system may be scaled and expanded without problem. In order to be able to coordinate the required sequences in the system during the activation process (revving-up), it is proposed that one of the control units temporarily assume the function of master control unit. The remaining control units are treated as slave control units during the activation process. Which control unit is drawn upon as master control unit may be determined at will.

At least one of the control units has a central memory in which data required for the time-controlled communications are stored. Within the framework of the activation of the system, these data are transmitted to the individual control units which have logged on to the communications system, and are there stored, for example, in the volatile memory. The master control unit coordinates the activation process of the system, particularly the reading out of the data from the central memory, and the transmission of the data via the communications system to the control units.

As long as one of the control units assumes the master function, the local time of the master control unit is used as the global time base for the communications system. The remaining control units are synchronized with this local time base. After the expiration of a predefinable time duration (a so-called timeout) or after termination of the activation process of the system, the master control unit gives up its master function again, and becomes an equal-access communications user, in addition to the remaining control units. In this connection, the transition is made from the local time base of the master control unit to the global time base. All the communications users are synchronized with the global time base. This is formed with the participation of all the control units logged on to the communications system. The global time may be set, for instance, by developing the average value of all the local time bases of the control units. The control units ascertain individual differences between their local time base and the global one. In the control units the difference is added to the local time base, and the sum is used as the global time base.

According to one advantageous further development of the present invention, it is proposed that a control unit having the central memory becomes the temporary master control unit.

Alternatively, it is proposed that the control unit which first terminates its own start routine after the starting of the system becomes the temporary master control unit.

According to one preferred specific embodiment of the present invention, it is proposed that each control unit, after termination of its own start routine, receive signals present in the communications system for a predefinable period. If a control unit does indeed receive signals, it is assumed that it is not the first control unit which has terminated its own start routine. For, the signals that are received by the control unit via the communications system are indeed emitted by those control units which had terminated their start routine before (this) control unit. If signals were received, after expiration of the predefinable time period, the control units transmit signals over the communications system for the purpose of logging on with the temporary master control unit as communications users.

If a control unit receives no signals, it is assumed that it is the first control unit which has terminated its own start routine. It is proposed that a control unit become the temporary master control unit if no signals were received, during this time period, from the remaining control units.

According to another advantageous further development of the present invention, it is proposed that a signal be transmitted by the temporary master control unit over the communications system, after the start of the system. The master control unit transmits the signal at the latest after terminating its own start routine. The signal may include information on which of the control units has assumed the master function (control unit-specific identifier of the master control unit), and on with which time base the remaining control units should synchronize (local time base of the master control unit). The signal may also be a request to the remaining control units to identify themselves to the master control unit and to log on to the communications system.

According to a further preferred specific embodiment of the present invention, it is proposed that the signal be transmitted by the temporary master control unit individually to the remaining control units. The definite identifications of the remaining control units are known to the master control unit, for example, by the aid of data from the communications protocol.

It is suggested alternatively that a signal from the temporary master control unit be transmitted cyclically to all the remaining control units. The signal according to this alternative specific embodiment is not intended for a specific control unit, but for all the remaining control units which have not yet logged on as communications users. Those of the remaining control units, which have terminated their start routines, receive the signal and log on as communications users with the master control unit.

The signal is advantageously received by the remaining control units and, as response to the received signal, a response signal is sent to the temporary master control unit via the communications system. Upon receipt of the response signal by one of the remaining control units, the master control unit coordinates the transmission of the data from the central memory to the corresponding control unit via the communications system. The data transmission may occur, for example, in data packets, so that the master control unit may continue to transmit signals to the remaining control units and may process the response signals of the remaining control units.

A control unit-specific identifier is preferably transmitted along with the response signal. In this manner, the master control unit is informed which of the remaining control units has logged on as a communications user. The identifier may be developed as software-related or hardware-related. For example, a connecting element for connecting a control unit to the communications system may have contact pins or terminal pins whose coding makes possible the unique identification of the control unit. The number of coded pins determines the number of possible combinations. For example, two bits are used for coding the four control units of an EMB, e.g. 00 for left front, 01 for right front, 10 for rear left and 11 for rear right.

As a further possibility for control unit-individual coding of the control units it is proposed that, after receipt of the signal by the temporary master control unit, a delay take place over a time period predefinable for the individual control unit, before the response signal is sent. The remaining control units respond, at the latest after termination of their start routines, to the signal emitted by the master control unit, using a uniquely defined skew delta_t, which is ascertained with the aid of their own unique identification i of each control unit. If the master control unit emits the signal cyclically, the remaining control units respond in at least one cycle. Besides, the skew delta_t is smaller than the cycle time T of the bus master signal divided by the maximum possible number n of the bus users. A possible algorithm for the skew delta_t is:

$$\Delta t = \frac{T}{n-i+1}, \text{ where } i \in [0, n].$$

In addition it is proposed that the master control unit receive the response signals of the remaining control units, and that the data from the intermediate memory be transmitted via the communications system to those of the remaining control units whose response signals were successfully received.

In case that, first of all, the control unit which was first to finish its own start routines after the start of the system was the temporary master control unit, it is proposed that, after a predefinable time period or upon the command of the control unit having the central memory, the temporary master function be transferred to the control unit having the central memory. For the transfer of the master function, the control unit having the central memory may transmit a corresponding message via the communications system to the remaining communications users. Initialization of the system is then continued by the control unit having the central memory as described above. After transfer to it of the master function, the control unit having the central memory coordinates the necessary sequences during the remaining activation process in the system, in particular it coordinates the logging on as communications users the control units that have not yet logged on.

Within the framework of the transfer of the master function, data as to which control units have already been logged on as communications users also have to be transferred to the control unit having the central memory. The data also include statements saying to which control units data required for the time-controlled communications have already been transmitted from the central memory. Therefore, it is further suggested that, upon transfer of the master function from the control unit which, after start of the system, was the first to finish its own start routines, information as to which of the control units have already logged on to the communications system be transmitted to the control unit having the central memory. The transmission of the data may be performed in different ways:

a) Upon transfer to the control unit having the central memory, the data are explicitly transmitted by the previous master control unit to the control unit.

b) The cyclical signal sent by the previous master control unit included the data. This signal was also received by the control unit having the central memory, so that the required data are available there at the point in time of the transfer of the master function.

c) Each logged-on communications user sends its status, in particular statements as to whether it has already received the data required for the time-controlled communications from the central memory, until after the transfer of the master function.

d) Upon transfer of the master function, each communications user transmits its status again.

Implementing the method of the present invention in the form of a computer program is particularly important. The computer program may be run on a computing unit, particularly a microprocessor, of a motor vehicle control device, and is suitable for executing the method according to the present invention. In this case, therefore, the present invention is realized by way of a computer program, so that this computer program constitutes the present invention in the same way as the method for whose performance the computer program is suitable.

The computer program is advantageously stored on a storage element. In particular, an electrical storage medium, for example, a random-access memory, a read-only memory or a flash memory, may be used as the memory element. In this case, therefore, the present invention is realized by way of a computer program stored on the memory element, so that this storage element provided with the computer program constitutes the present invention in the same way as the method for whose execution the computer program is suitable.

As a further attainment of the object of the present invention, it is proposed, starting from the system for controlling and/or regulating operating sequences in a motor vehicle having several equal-access control units of the species named at the outset, that at least one of the control units has a central memory, in which data required for the time-controlled communications are stored for all the control units;

one of the control units acts as temporary master control unit during an activating process;

during the activating process, the master control unit coordinates logging on of the remaining control units to the communications system, in particular transmission of the data from the central memory to the remaining control units via the communications system; and the master control unit ends the temporary master function upon the expiration of a predefinable time duration or at termination of the activating process.

According to one advantageous further development of the present invention, it is proposed that a control unit having the central memory becomes the temporary master control unit.

Alternatively, it is proposed that the control unit which first terminates its own start routine after the starting of the system becomes the temporary master control unit.

DETAILED DESCRIPTION

Figure 1:
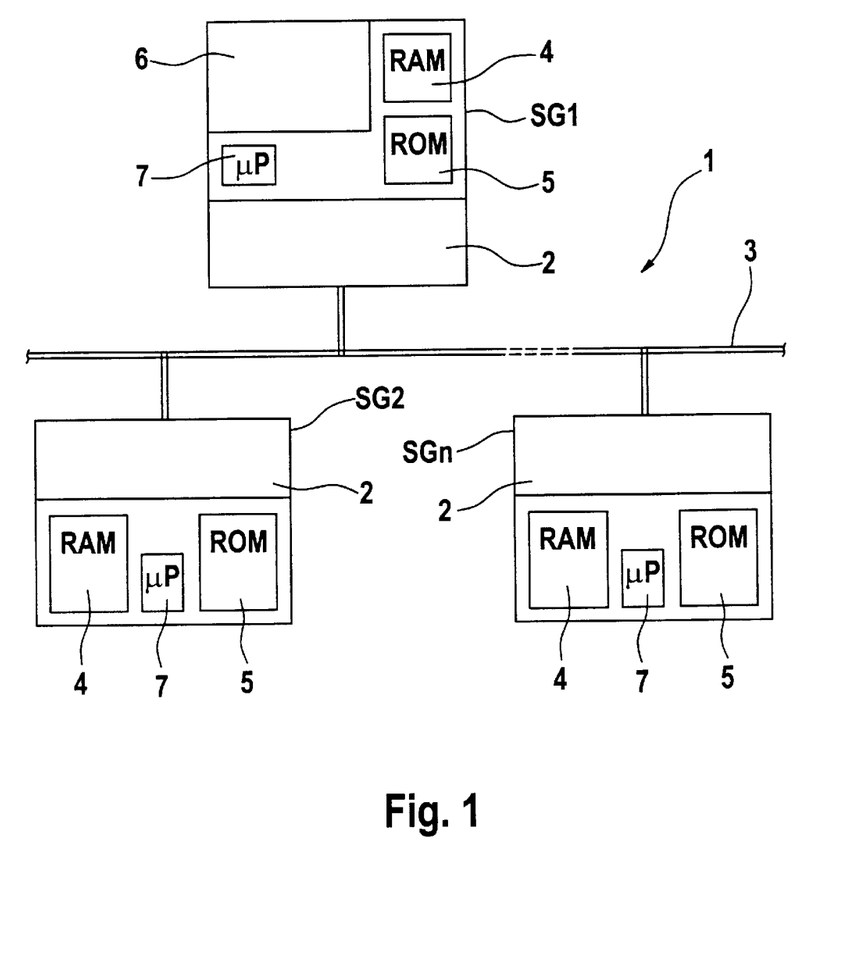
FIG. 1 shows a system of the present invention according to one preferred specific embodiment.

FIG. 1 shows a system for controlling and/or regulating operating sequences in a motor vehicle, denoted as reference numeral 1 in its entirety. System 1 is used, for example, for regulating an electromechanical brake (EMB; brake-by-wire) of a motor vehicle. System 1 includes several equal-access control units SG1, SG2, ..., SGn, which are respectively used for controlling and/or regulating a certain functionality in the motor vehicle. In the case of EMB, four control units are provided, one for each wheel, which are identically constructed and are operated using the same software. The four control devices fulfill the same function, namely, adjusting the braking force according to a setpoint selection. Control units SG1, SG2, ..., SGn are connected to a time-controlled communications system 3 via a connecting element 2, such as a bus interface. The data transmission takes place over communications system 3, for instance, according to the TTP/C Protocol (time-triggered protocol, SAE Class C) or the FlexRay Protocol (a communications system under development by BMW, DaimlerChrysler, Motorola, Philips and Bosch; information available on the Internet under http://www.flexray-group.com).

Control units SG1, SG2, ..., SGn each have a volatile memory 4, and a nonvolatile memory 5 in which a loading routine is stored. Volatile memory 4 is designed, for instance, as a RAM (random-access memory). Nonvolatile memory 5 is designed, for instance, as an EPROM (electronically programmable read-only memory) or as an EEPROM (electronically erasable and programmable read only memory) or as a flash memory.

At least one of the control units, in the present exemplary embodiment control unit SG1, has a central memory 6. Central memory 6 is designed, for instance, as an EPROM (electronically programmable read only memory) or as an EEPROM (electronically erasable and programmable read only memory) or as a flash memory. Data required for the time-controlled communications are stored in central memory 6 for the control units SG1, SG2, ..., SGn of system 1. In addition, data may be stored in central memory 6 in the form of control and/or regulating programs for control units SG1, SG2, ..., SGn which are identical for all control units SG1, SG2, ..., SGn. These data are transmitted during an activating process of system 1 via communications system 3 to volatile memories 4 of control units SG2, ..., SGn.

In order to coordinate the activating process via time-controlled communications system 3, it is proposed according to the present invention that one of control units SG1, SG2, ..., SGn be used as temporary master control unit. The remaining control units then work as temporary slave control units. During the activating process of system 1, the master control unit coordinates logging on of the remaining control units to communications system 3, in particular transmission of the data from central memory 6 to the remaining control units via communications system 3. The master control unit gives up again the temporary master function upon the expiration of a predefinable time duration or at termination of the activating process of system 1.

The temporary master function may be assumed by various control units SG1, SG2, ..., SGn of system 1. According to the present invention, two cases are particularly proposed:

1) Control unit SG1 having central memory 6 assumes the temporary master function.
2) The control unit which is the first to finish its own start routines after the starting of system 1, e.g. control unit SG2, assumes the temporary master function.

The temporary master control unit sends a signal over communications system 3, which requests a response signal from the remaining control units. At the latest after ending their own start routines, the remaining control units, after receiving the signal, send the requested signal to the master control unit via communications system 3. After receiving the response signal, the master control unit initiates the transmission of the data from central memory 6 to the control unit which has sent the response signal. The data transmission is preferably carried out in data packets, so that the master control unit may continue to send signals to the remaining control units.

Figure 2:
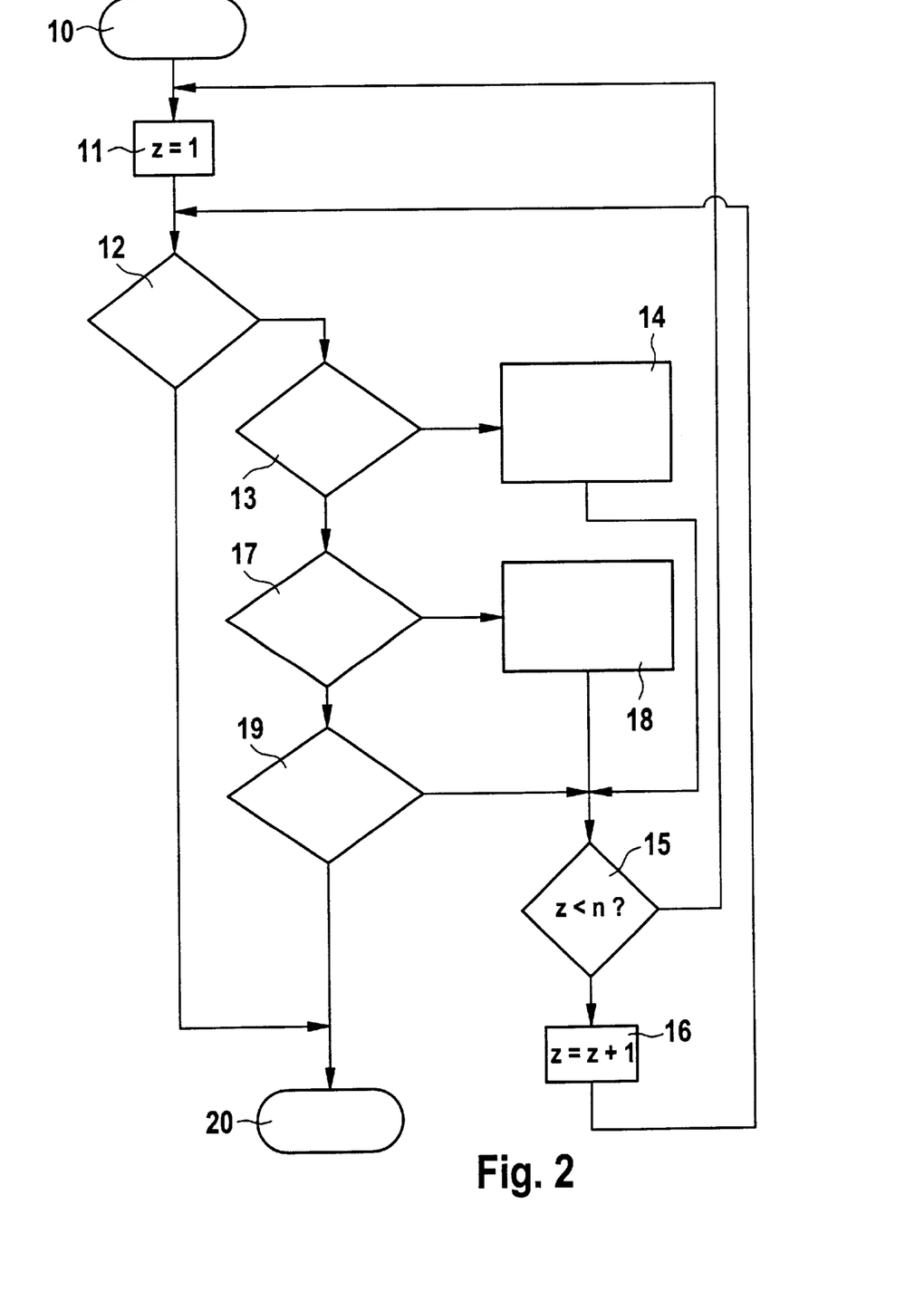
FIG. 2 shows a flow diagram of a method according to the present invention to be run in a control unit of the system in FIG. 1 which has temporarily assumed a master function, according to a first preferred specific embodiment.
Figure 3:
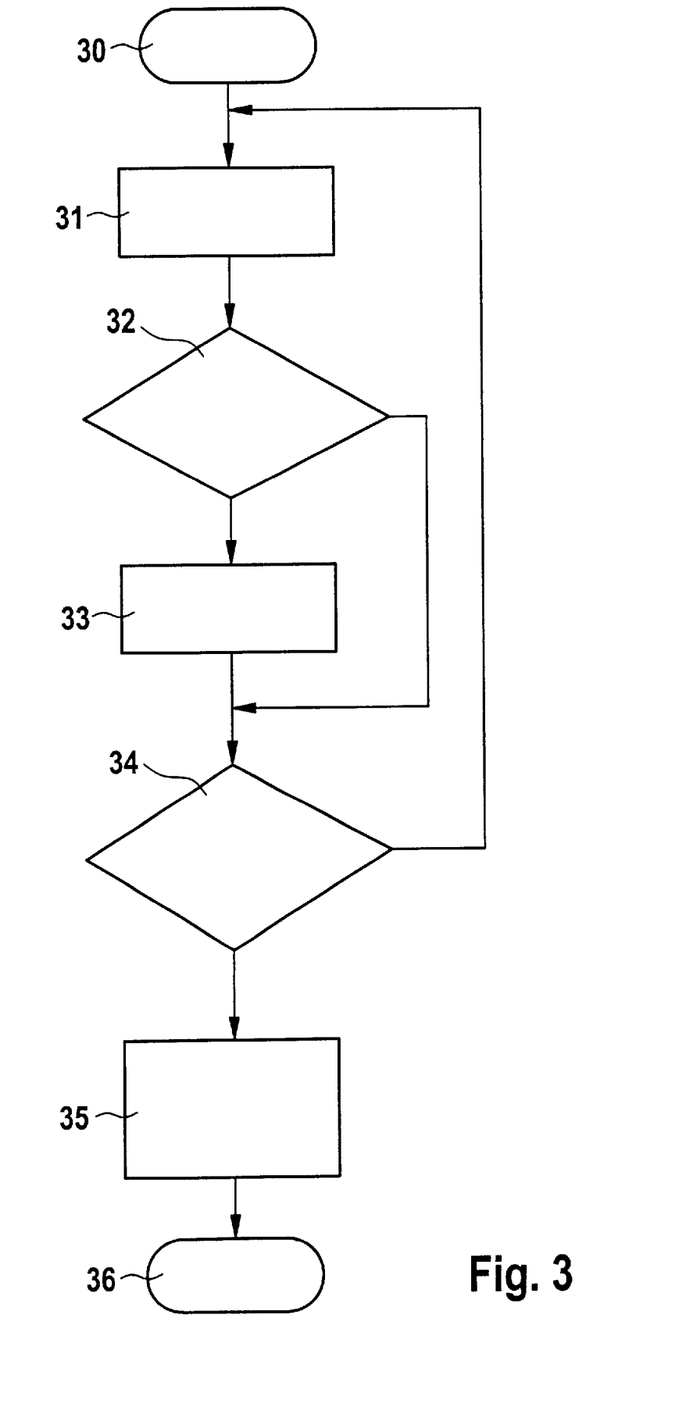
FIG. 3 shows a flow diagram of a method according to the present invention to be run in a control unit of the system in FIG. 1 which has temporarily assumed a slave function, according to a first preferred specific embodiment.

In the case in which control unit SG1, having central memory 6, has temporarily assumed the master function, at the latest after ending its own start routines, control unit SG1 sends an individual signal representing a request to respond to each of the remaining control units SG2, ..., SGn, known in the light of data from a communications protocol. The remaining control units SG2, ..., SGn may be addressed with the aid of a unique identification. The signal is sent during a predefinable time period. At the first correct response from one of the remaining control units SG2, ..., SGn, there begins for this one the transmission of the required communications data from central memory 6. The method is run through until either a predefinable time (timeout) has expired or all remaining control units SG2, ..., SGn report a successful transmission of the data for the communications protocol. FIG. 2 shows a flow diagram of a corresponding method to be run in control unit SG1 having central memory 6, which has temporarily assumed the master function. A flow diagram of a corresponding method to be run in one of the remaining control units SG2, ..., SGn is shown in FIG. 3.

The method of FIG. 2 begins in a function block 10. In function block 11 a control variable z is set equal to one. Control variable z begins at one, and is each time increased by one, up to a total number n of all control units minus one (n−1). Thereafter, control variable z is again set to one and incremented anew.

In an interrogation block 12 it is checked whether the predefinable time (timeout) has already expired and the method should be ended. If not, the system branches to an interrogation block 13, where it is checked whether control unit SGz has logged in to master control unit SG1 as communications user. If not, the system branches to system block 14, where master control unit SG1 sends the signal in the form of a request for a response to control unit SGz. From there the method branches to an interrogation block 15, where it is checked whether the variable z has not yet reached the final value (n−1). If not (i.e. the final value (n−1) has been reached), the method branches to function block 11, control variable z is reset to one, and the method is run through once more. If yes, (i.e. control variable z is still smaller than or equal to (n−1)), the method branches to a function block 16, where control variable z is increased by one. After that, the method branches again to interrogation block 12, and the method is run through once more.

If it is determined in interrogation block 13 that control unit SGz has already been logged in as communications user, the method branches to an interrogation block 17, where it is checked whether control unit SGz has been initialized yet. If not, the method branches to a function block 18, and the data for the time-controlled communications are transmitted from central memory 6 to control unit SGz via communications system 3, and stored there in volatile memory 4. From there, the method at interrogation block 15 is continued.

If it is determined in interrogation block 17 that control unit SGz has already been initialized, the method branches to an interrogation block 19, where it is checked whether all remaining control units SG2, ..., SGn have been initialized yet. If not, the method is again continued at interrogation block 15. If yes, the method branches to a function block 20, where the part of the method according to the present invention running on master control unit SG1 is ended.

The method in FIG. 3 begins in a function block 30. In a function block 31, the signals present in communications system 3 are read in by one of the remaining control units SG2, ..., SGn, in the present case by control unit SG2. In an interrogation block 32 it is checked whether the signals received include a request for response by master control unit SG1 to receiving control unit SG2. If yes, control unit SG2 sends a response signal in a function block 33, to master control unit SG1 via communications system 3. The method is then continued in an interrogations block 34. If it is determined in interrogation block 32 that a request for response was not received, the method branches directly to interrogation block 34.

In interrogation block 34 it is checked whether data for the time-controlled communication was received from central memory 6, or whether a predefinable time period (timeout) has expired. If not, the method branches to function block 31, and signals present in communications system 3 are read in once more. If yes, control unit SG2 sends its own status in a function block 35, to master control unit SG1 via communications system 3. In a function block 36 the part of the method according to the present invention running on one of slave control units SG2 is ended.

Figure 4:
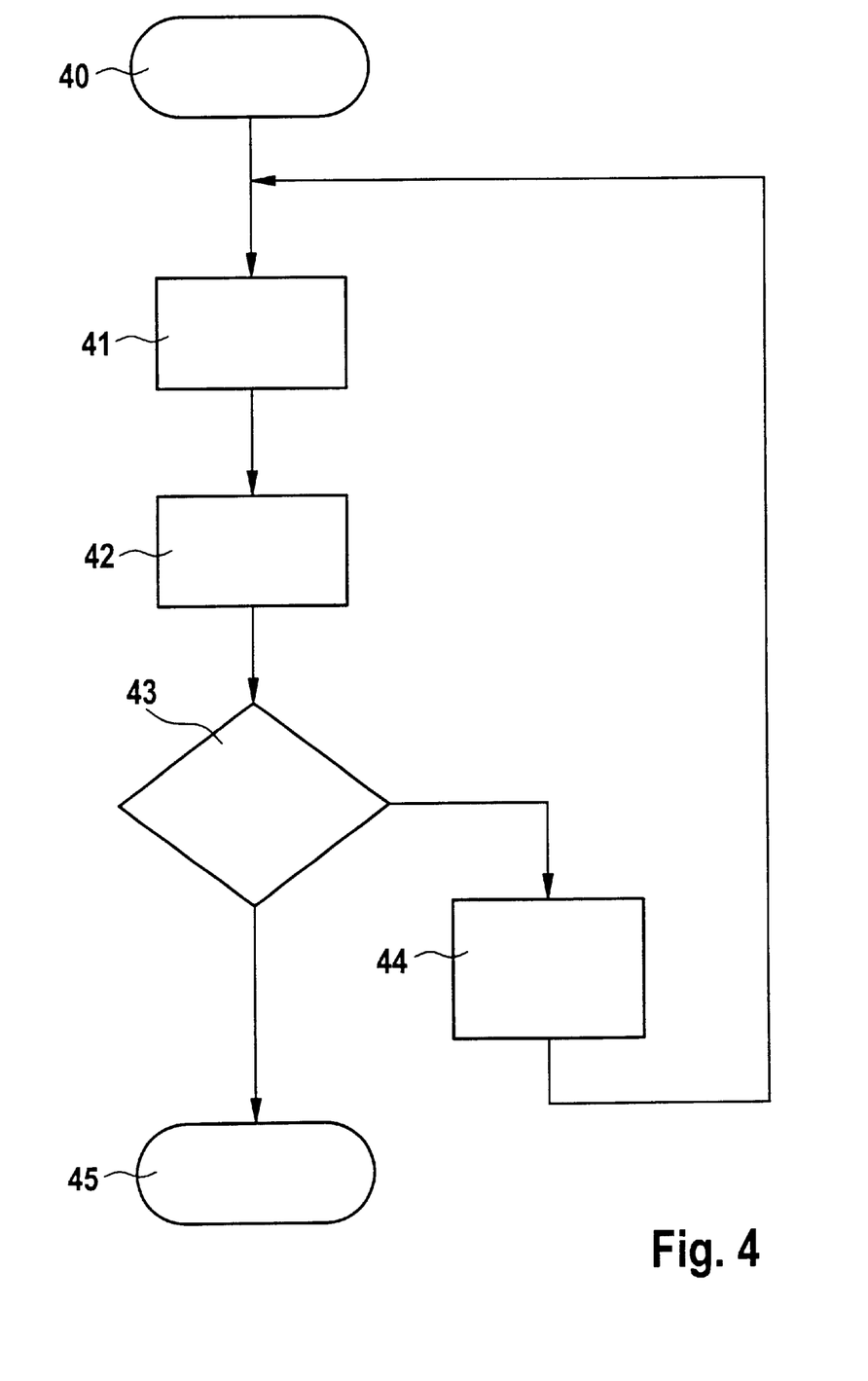
FIG. 4 shows a flow diagram of a method according to the present invention to be run in a control unit of the system in FIG. 1 which has temporarily assumed a master function, according to a second preferred specific embodiment.
Figure 5:
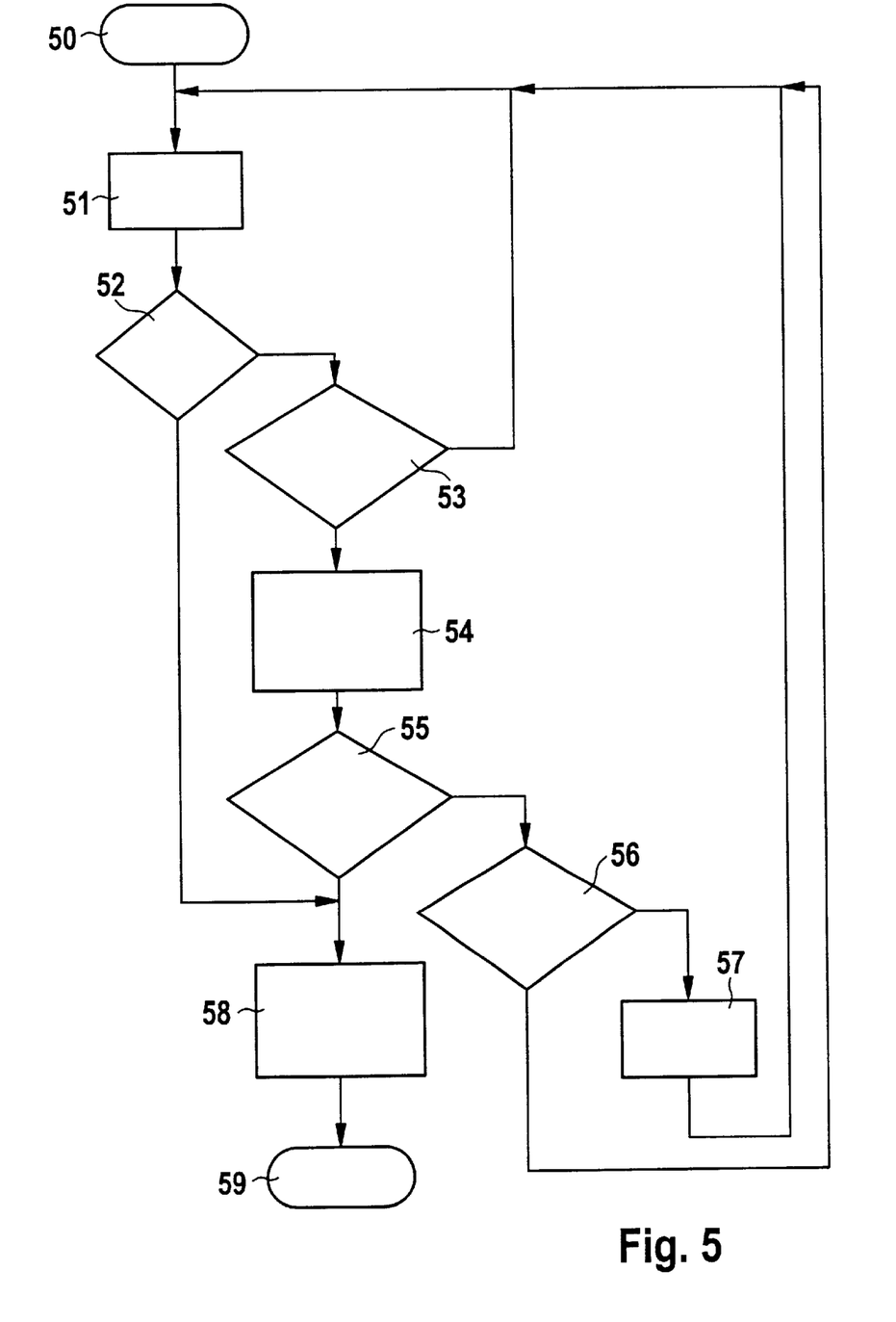
FIG. 5 shows a flow diagram of a method according to the present invention to be run in a control unit of the system in FIG. 1 which has temporarily assumed a slave function, according to a second preferred specific embodiment.

FIG. 4 shows a flow diagram of a further method to be run on control unit SG1 having central memory 6, which has temporarily assumed the master function. A flow diagram of a corresponding method to be run on one of the remaining control units SG2, ..., SGn is shown in FIG. 5. Control unit SG1 having connected central memory 6 emits a cyclical signal, at the latest after the ending of its own start routines. The remaining control units SG2, ..., SGn respond, to the extent that they already prepared to do so, in at least one cycle with a uniquely determined skew delta_t. Skew delta_t is ascertained, for example, with the aid of its own unique identification i. It is less than cycle time T of the bus master signal divided by the maximum possible number n of control units SG1, SG2, ..., SGn. A possible algorithm for the skew delta_t is:

$$\Delta t = \frac{T}{n - i + 1}, \text{ where } i \in [0, n].$$

Just as in the exemplary embodiment in FIGS. 2 and 3, transmission of the data packets may begin after a first-time correct response of a control unit SG2, ..., SGn. The further progression of the transmission is also analogous to the method described there.

The method in FIG. 4 begins in a function block 40. In a function block 11 [sic] master control unit SG1 emits a signal in the form of an initializing signal via communications system 3. This signal is not specified for a specific one of remaining control units SG2, .... SGn, but rather for all remaining control units SG2, ..., SGn. In a function block 42, master control unit SG1 then reads in all the signals present on communications system 3, and therewith also the response signals of the remaining control signals SG2, ..., SGn. In an interrogation block 43 it is checked whether all remaining control units SG2, ..., SGn, from which response signals were received, have been initialized or whether a predefinable time (timeout) has expired. If not, the data for the time-controlled communication are sent in a function block 44 from central memory 6, via communications system 3, to the one or more not yet initialized control signal(s) SG2, ..., SGn.

The method is then continued in function block 41, where master control unit SG1 sends out a signal once more. If it is determined in interrogation block 43 that all control units SG2, ..., SGn have been initialized and/or the predefinable time (timeout) has already expired, the part of the method according to the present invention running on temporary master control unit SG1 is ended in a function block 45.

The method in FIG. 5 begins in a function block 50. In a function block 51, the signals present in communications system 3 are read in by one of the remaining control units SG2, ... SGn, in the present case by control unit SG2. In an interrogation block 52 it is checked whether a predefinable time period (timeout) has expired. If not, the method branches to an interrogation block 53, where it is checked whether the signals received include a cyclical request for response by master control unit SG1 to receiving control unit SG2. If yes, control unit SG2 waits in a function block 54 for the duration of the skew delta_t specific to the control unit. If not, the method is continued at function block 51, where the signals present on communications system 3 are received once more.

Starting from function block 54, the method is continued in an interrogation block 55, where it is checked whether the initialization data for the time-controlled communication have been received yet by control unit SG2. If not, it is checked in an interrogation block 56 whether control unit SG2 has as yet transmitted a response signal to master control unit SG1. If not, the method branches in a function block 57, in which control unit SG2 sends the response signal to master control unit SG1 via communications system 3. The method is then continued in interrogations block 51. If yes, the method branches from interrogation block 56 directly to function block 51.

If it is determined in interrogation block 55 that the initialization data have been received, in a function block 58 control unit SG2 transmits its own status to master control unit SG1 via communications system 3. In a function block 59 the part of the method according to the present invention running on one of slave control units SG2 is ended.

Figure 6A:
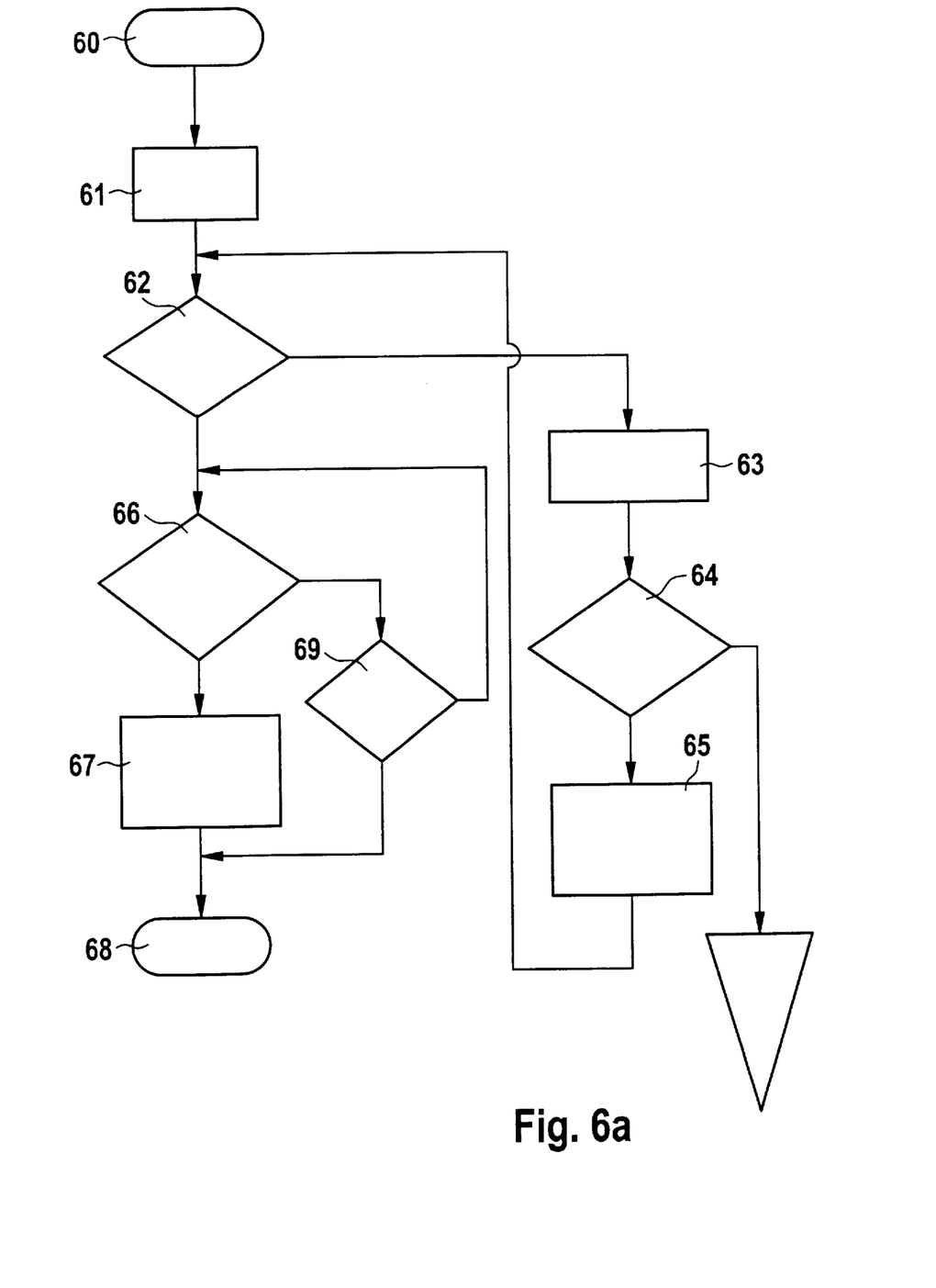
FIG. 6a shows a first flow diagram of a method according to the present invention to be run in a control unit of the system in FIG. 1, according to a third preferred specific embodiment.
Figure 6B:
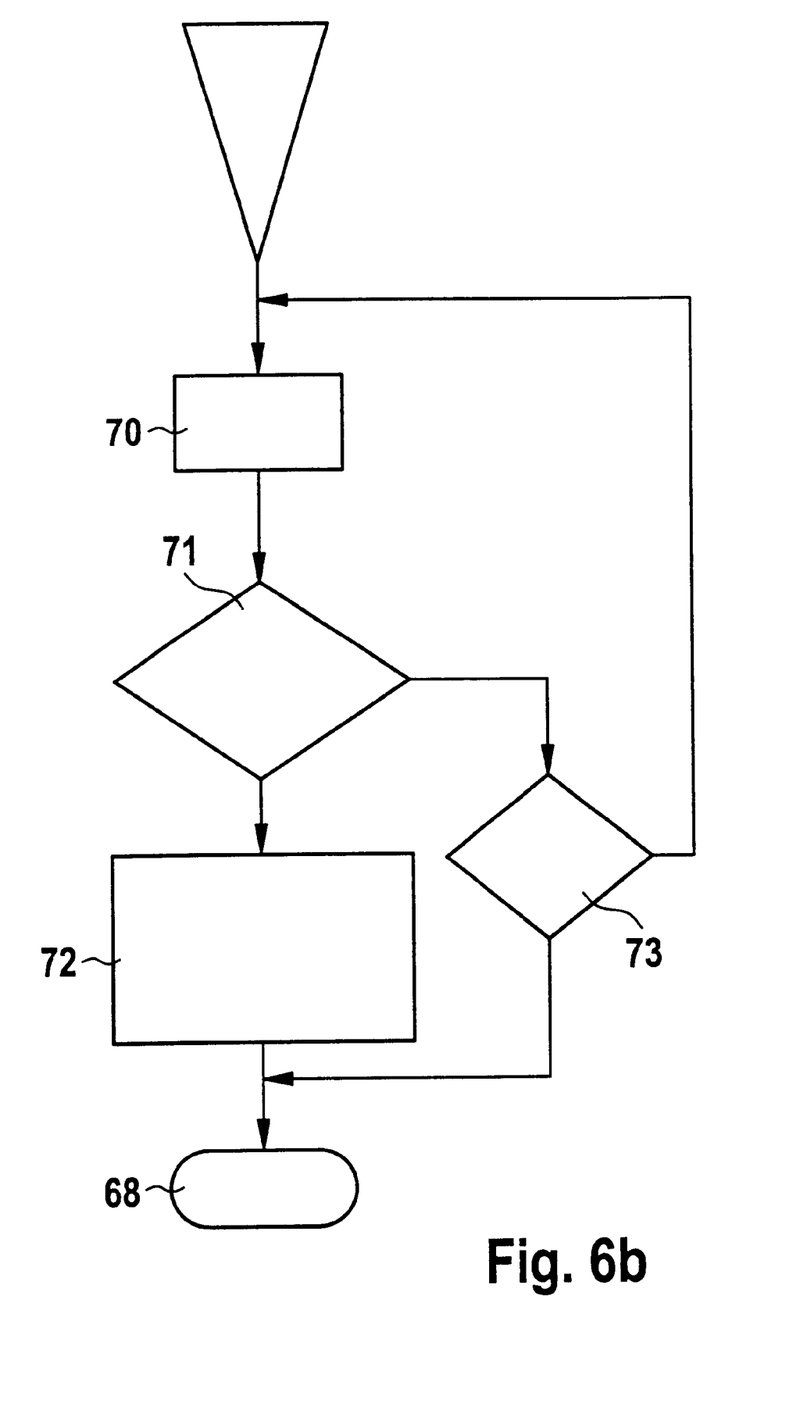
FIG. 6b shows a second flow diagram of a method according to the present invention to be run in the control unit of the system in FIG. 1, according to the third preferred specific embodiment

FIGS. 6a and 6b show a flow diagram of still another method according to the present invention to be run on any desired control unit of the system in FIG. 1. In this case, each control unit SG1, SG2, ..., SGn reads in the signals present in communications system 3 for a predefined time, at the latest after ending its own start routines. If no signals are present, the corresponding communications user emits a signal. If this signal has been successfully sent (i.e. corresponding control unit was the first to send this signal), it is cyclically repeated. In case of the conflict of several communications users, each one sends this signal once more, however, this time having a uniquely determined skew delta_t, which is ascertained in the light of its own identification which is specific to the control unit.

The control unit which is able to be the first to send a signal successfully, temporarily assumes the master function in system 1, and in the present case this is control unit SG2. The first successfully sent cyclic signal is responded to by the remaining control units SG1, SG3, ..., SGn at least once, using a skewed response signal, the skew delta_t once, being ascertained with the aid of their own unique identification.

The master function may be transferred from control unit SG2 to control unit SG1 after the expiration of a predefinable time or by control unit SG1 having the central memory 6, by a corresponding message. After the transfer of the master function by control unit SG1, it is able to continue the initialization in the manner described above. At the time of its taking over the master function, the information as to which communications users SG1, SG3, . . . , SGn are already present may be passed on to control unit SG1 in various ways. The following would be conceivable, for instance:

a) Upon the assumption by control unit SG1 having central memory 6, the data are explicitly transmitted explicitly by the previous master control unit SG2 to control unit SG1.

b) The cyclic signal sent by previous master control unit SG2 included the data. This signal was also received by control unit SG1 having central memory 6, so that the required data are available there at the point in time of the transfer of the master function.

c) Each logged-on communications user SG1, SG3, . . . , SGn sends its status, in particular statements as to whether it has already received the data required for the time-controlled communication from central memory 6, until after the transfer of the master function.

d) Upon transfer of the master function, each communications user SG2, . . . , SGn transmits its status again.

The method of FIGS. 6a and 6b begins in a function block 60. In a function block 61, the signals present in communications system 3 are read in. In an interrogation block 62 it is checked whether there are, in fact, any signals present in communications system 3. If not, the method branches to a function block 63, where control unit SG2 emits initialization signals. In an interrogation block 64 it is checked whether there is a collision with initialization signals from other control units SG1, SG3, . . . , SGn. If yes, control unit SG2 waits in a function block 65 for the duration of the skew delta_t specific to the control unit. Then the method is continued at function block 62, where it is checked once more whether bus signals are present in communications system 3.

If it is determined in interrogation block 62 that signals are present in communications system 3, it is checked in an interrogation block 66 whether control unit SG1, SG3, . . . , SGn has already received the initialization data for the time-controlled communication. If yes, in a function block 67, control unit SG1, SG3, . . . , SGn sends the status of its own initialization to master control unit SG2. The method according to the present invention is then ended in a function block 68.

If it is determined in interrogation block 66 that control unit SG1, SG3, . . . , SGn has not yet received any initialization data, then in an interrogation block 69 it is checked whether a predefinable time period (timeout) has already expired. If not, the method is continued at interrogation block 66, and it is checked once more whether initialization data have been received. If yes, the method branches to function block 68, and the method is ended.

If in interrogation block 64 it is determined that no collision with signals from other control units SG1, SG3, . . . , SGn is present, the method is continued in FIG. 6b at a function block 70, where signals present in communications system 3 are read in. In an interrogation block 71 it is checked whether control unit SG1 having central memory 6 is to assume the master function. If yes, in function block 72, data concerning the initialization of system 1, particularly which of the communications users SG1, SG3, . . . , SGn have already logged on, are transmitted to control unit SG1. Control unit SG1 then assumes the master function for a predefinable time period or until all control units SG2, SG3, . . . , SGn of system 1 have been initialized, and the entire system 1 has been activated. Finally, the method is ended in interrogations block 68.

If it is determined in interrogation block 71 that control unit SG1 having central memory 6 is (not yet) to assume the master function, then in an interrogation block 73 it is checked whether a predefinable time period (timeout) has already expired. If not, the method is continued at function block 70, where the bus signals are read in once more. If yes, the method is ended in interrogation block 68.

For the execution of the method according to the present invention, as in FIGS. 2 through 6, a corresponding computer program is stored in non-volatile memory 5 on control units SG1, SG2, . . . , SGn, depending on whether they assume the master function or the slave function. The computer program may be run on a computing unit 7, particularly a microprocessor, of control units SG1, SG2, . . . , SGn and is suitable for executing the method according to the present invention. For the execution of the computer program, it is transmitted from non-volatile memory 5 to computing unit 7 either as instructed or as a whole. During processing, received or ascertained data may be stored, for example, in volatile memory 4.

What is claimed is:

1. A method for activating a first system for at least one of controlling and regulating an operational sequence in a motor vehicle that includes a plurality of equal-access control units for at least one of controlling and regulating a function in the motor vehicle, the control units each including a volatile memory and a non-volatile memory including a loading routine and being connected to one another by a time-controlled communications system, the method comprising:

switching on the first system;

causing one of the control units to temporarily become a master control unit;

in a central memory of at least one of the control units, storing data for a time-controlled communication for all the control units;

during an activating process of the first system, causing the one of the control units corresponding to the master control unit to coordinate a logging on of remaining ones of the control units to the time-controlled communications system; and ending a temporary master function of the master control unit one of upon an expiration of a predefinable time period and at a termination of the activating process.

2. The method as recited in claim 1, wherein:

the logging on includes transmitting data from the central memory to the remaining ones of the control units via the time-controlled communications system.

3. The method as recited in claim 1, wherein:

the one of the control units having the central memory corresponds to the master control unit.

4. The method as recited in claim 1, wherein:

one of the control units that first terminates a start routine thereof after the switching on of the first system corresponds to the master control unit.

5. The method as recited in claim 4, further comprising:

causing each control unit to receive signals present in the time-controlled communications system for the predefinable time period, after ending a start routine.

6. The method as recited in claim 5, wherein:

one of the control units becomes the master control unit if no signals were received from the remaining control units during the predefinable time period.

7. The method as recited in claim 1, further comprising:
after the switching on of the first system, causing the master control unit to send a signal via the time-controlled communications system.

8. The method as recited in claim 7, further comprising:
causing the master control unit to send the signal individually to the remaining control units.

9. The method as recited in claim 7, further comprising:
causing the temporary master control unit to send a signal cyclically to all the remaining control units.

10. The method as recited in claim 7, wherein:
the signal is received by the remaining control units, and as a response to the received signal, a response signal is sent to the master control unit via the time-controlled communications system.

11. The method as recited in claim 10, further comprising:
transmitting an identifier specific to one of the control units along with the response signal.

12. The method as recited in claim 11, wherein:
after receipt of the response signal by the master control unit, the master control unit waits for another predefinable time period that is specific to each control unit before another response signal is sent.

13. The method as recited in claim 10, wherein:
the master control unit receives response signals of the remaining control units, and
the data from the central memory are sent via the time-controlled communications system to those of the remaining control units whose response signals were successfully received.

14. The method as recited in claim 1, wherein:
in case that, first of all, one of the control units that was the first to end a start routine thereof after the switching on of the system was the master control unit, that, one of after the predefinable time period and upon an instruction from the control unit including the central memory, the temporary master function is transferred to the control unit having the central memory.

15. The method as recited in claim 14, wherein:
upon transfer of the temporary master function to the control unit having the central memory, data as to which of the control units have already logged on to the time-controlled communications system are transmitted to the control unit having the central memory.

16. A computer program that when executed on a computing unit of one of a plurality of control units for at least one of controlling and regulating a functions in a motor vehicle results in a performance of:
switching on a first system;
causing one of the control units to temporarily become a master control unit;
in a central memory of at least one of the control units, storing data for a time-controlled communication for all the control units;
during an activating process of the first system, causing the one of the control units corresponding to the master control unit to coordinate a logging on of remaining ones of the control units to the time-controlled communications system; and
ending a temporary master function of the master control unit one of upon an expiration of a predefinable time period and at a termination of the activating process.

17. The computer program as recited in claim 16, wherein:
the computing unit includes a microprocessor.

18. The computer program as recited in claim 16, wherein:
the computer program is stored on a memory element including one of a random-access memory, a read-only memory, and a flash memory.

19. A system for at least one of controlling and regulating an operating sequence in a motor vehicle, comprising:
a plurality of equal-access control units for at least one of controlling and regulating a function in the motor vehicle, each control unit including a volatile memory and a non-volatile memory including a loading routine, and being connected to one another via a time-controlled communications system, wherein:
at least one of the control units includes a central memory in which data required for a time-controlled communication are stored for all the control units,
one of the control units acts as a temporary master control unit during an activating process of the system,
during the activating process, the temporary master control unit coordinates logging on of the remaining control units to the time-controlled communications system, and
the temporary master control unit ends a temporary master function one of upon an expiration of a predefinable time period and at a termination of the activating process.

20. The system as recited in claim 19, wherein:
the logging on includes transmitting data from the central memory to the remaining control units via the time-controlled communications system.

21. The system as recited in claim 19, wherein:
the temporary master control unit corresponds to the at least one of the control units including the central memory.

22. The system as recited in claim 19, wherein:
one of the control units that first terminates a start routine thereof after a start of the system corresponds to the temporary master control unit.

* * * * *